United States Patent
Schwanz et al.

(10) Patent No.: US 6,189,057 B1
(45) Date of Patent: Feb. 13, 2001

(54) MOTOR VEHICLE ACCESSORY INTERFACE FOR TRANSFERRING SERIAL DATA WITH AND SUPPLYING DC POWER TO EXTERNAL ACCESSORY DEVICE

(75) Inventors: Kevin A. Schwanz, Novi; David A. Pruett, Ypsilanti, both of MI (US); Tracey Stanyer, Roscoe, IL (US)

(73) Assignee: Chrysler Corporation, Auburn Hills, MI (US)

(*) Notice: Under 35 U.S.C. 154(b), the term of this patent shall be extended for 0 days.

(21) Appl. No.: 09/152,968

(22) Filed: Sep. 14, 1998

(51) Int. Cl.[7] .................................................. G06F 13/12
(52) U.S. Cl. ............................... 710/72; 701/33; 307/10.6
(58) Field of Search ........................ 701/29, 33; 361/686; 307/10.6; 710/72; 324/38; 714/27

(56) References Cited

U.S. PATENT DOCUMENTS

| | | | |
|---|---|---|---|
| 4,305,004 | * 12/1981 | Tanaka et al. | 307/10.6 |
| 4,602,127 | * 7/1986 | Neely et al. | 379/68 |
| 4,853,850 | * 8/1989 | Krass, Jr. et al. | 701/35 |
| 4,866,616 | 9/1989 | Takeuchi et al. | 364/424.04 |
| 4,970,496 | 11/1990 | Kirkpatrick | 340/585 |
| 4,972,470 | * 11/1990 | Farago | 380/3 |
| 5,218,302 | 6/1993 | Loewe et al. | 324/380 |
| 5,293,317 | 3/1994 | Adrain et al. | 364/431.12 |
| 5,459,660 | * 10/1995 | Berra | 701/33 |
| 5,541,840 | 7/1996 | Gurne et al. | 364/424.03 |
| 5,555,498 | * 9/1996 | Berra et al. | 701/33 |
| 5,659,680 | * 8/1997 | Cunningham et al. | 714/25 |
| 5,859,628 | * 1/1999 | Ross et al. | 345/173 |
| 5,916,287 | * 6/1999 | Arjomand | 701/29 |
| 5,935,180 | * 8/1999 | Fieramosca et al. | 701/29 |

\* cited by examiner

Primary Examiner—Thomas C. Lee
Assistant Examiner—Albert Wang
(74) Attorney, Agent, or Firm—Roland A. Fuller, III

(57) ABSTRACT

A module for interfacing with a serial data bus of an on-board computer system of a motor vehicle to provide a means by which an external device such as a lap top computer, electronic compass, etc., can exchange useful data therefrom. The module includes a controller having a vehicle data bus interface circuit which interfaces the module with the serial data bus. An accessory device interface circuit interfaces the module with the external device. The module provides a power connection terminal to provide power from the vehicle's electrical system to the external device. The module forms a low cost means by which various external devices can be interfaced with the on-board computer of the vehicle to exchange useful information and to enhance operation of the vehicle or the external device.

11 Claims, 2 Drawing Sheets

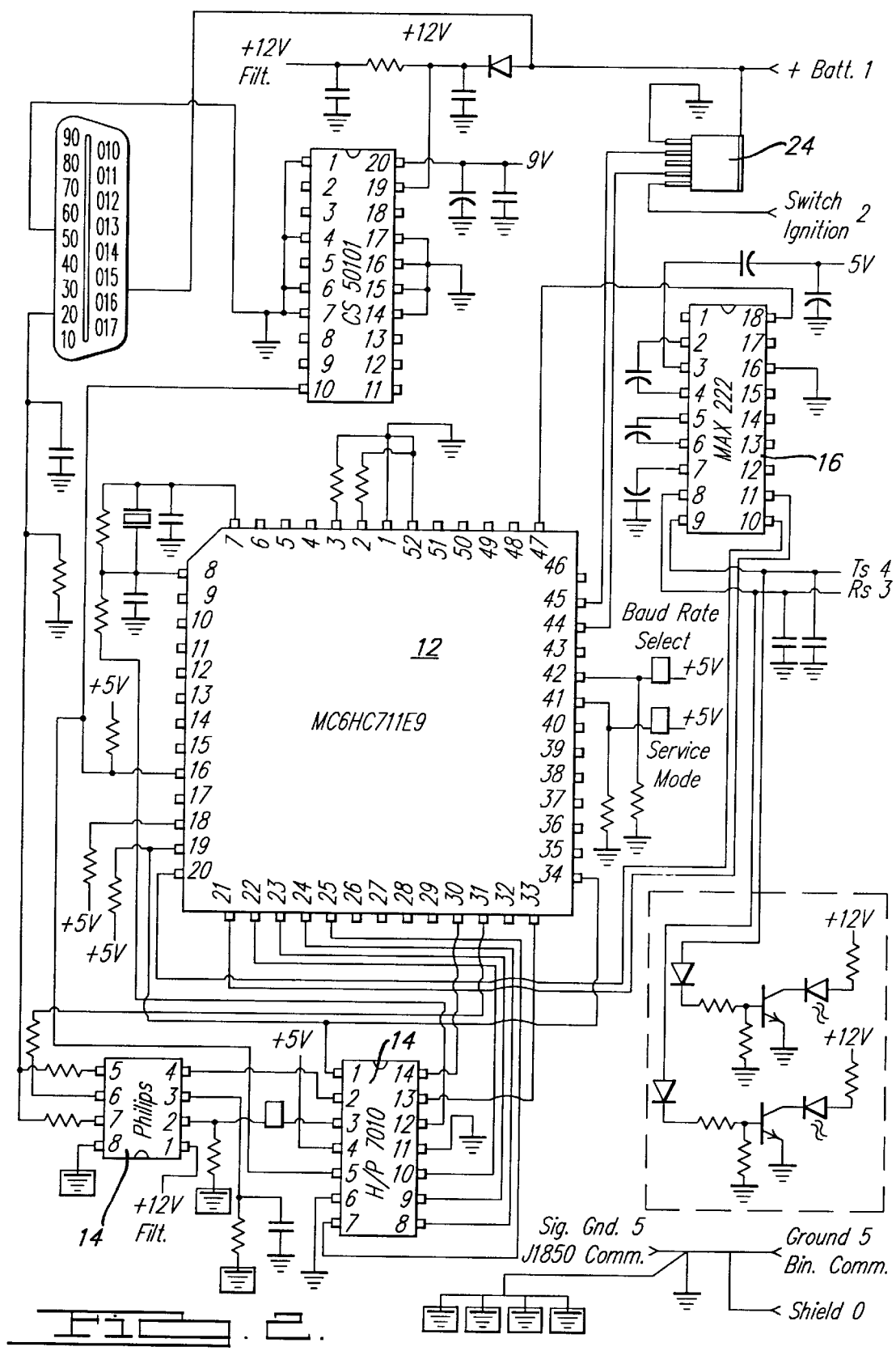

MOTOR VEHICLE ACCESSORY INTERFACE FOR TRANSFERRING SERIAL DATA WITH AND SUPPLYING DC POWER TO EXTERNAL ACCESSORY DEVICE

BACKGROUND OF THE INVENTION

1. Technical Field

This invention relates to accessory modules for use in connection with an electrical system of a motor vehicle, and more particularly to a module for providing a connecting point to a serial data bus of an onboard computer of a motor vehicle to allow communication between the serial data bus and an external accessory device.

2. Discussion

As computers and other sophisticated electronic devices become more powerful and more compact, the opportunity increases to use such devices in motor vehicles such as automobiles and trucks. In particular, the increasing availability of lap top or palm top computers is accelerating this trend.

In present day motor vehicles an on-board computer, typically known in the industry as an electronic control module (ECM), is used which is capable of controlling a large number of various electronic components of a vehicle. This is facilitated, in part, by a data bus which is used to transfer information between the ECM and the various electronic sub systems of the vehicle. The data bus of the vehicle carries a large amount of useable electronic information relating to the operation of the vehicle and its numerous electronically controlled subsystems.

In view of the large amount of useful information that is transmitted over the vehicle's data bus, it would be highly desirable to provide some form of relatively inexpensive apparatus which directly interfaces with the vehicle's data bus and allows communication of information from the vehicle's data bus to an external accessory device such as a lap top computer, an electronic compass, etc., and which also is capable of allowing a limited amount of information to be transferred between the device and the vehicle's data bus. In this matter, the information on the vehicle's data bus could be used to enhance operation of the external accessory devices, such as enhancing the operation of an application program running on a lap top computer. Conversely, in certain applications, the operation of the vehicle could be enhanced by information provided to the vehicle data bus by the external device. Also, by providing a convenient point to make electrical connections, such an external device as a lap top computer or an electronic compasses could be quickly and easily coupled and uncoupled to the vehicle's data bus without special tools or time consuming procedures.

Accordingly, it would be highly desirable to provide an apparatus which is capable of allowing an external device such as a lap top computer, an electronic compass, etc., to be quickly and easily interfaced to a vehicle's data bus so as to be able to receive information from the data bus or to transmit information to the data bus.

SUMMARY OF THE INVENTION

The apparatus of the present invention relates to a module that provides a convenient connection point to a vehicle's serial data bus to allow external accessory devices such as lap top computers, electronic compasses, etc., to be quickly and easily interfaced to the serial data bus of the vehicle. In a preferred embodiment the apparatus comprises a controller, and more preferably a microcontroller which is interfaced to the vehicle's serial data bus via a vehicle data bus interface circuit. The microcontroller is also interfaced to an accessory data bus interface circuit which allows the external accessory device to be coupled to the apparatus. The apparatus also includes a power terminal for providing power to the external accessory device. In one preferred installation the power terminal receives power from the vehicle power source continually. In another preferred embodiment the power terminal receives DC power through an ignition power relay switch which is controlled by the controller. Accordingly, in this embodiment, power is only available when the ignition of the vehicle is turned on. An accessory ground terminal is also provided.

In one preferred embodiment the accessory data bus interface circuit comprises an RS-232 interface circuit. In an alternative preferred embodiment the accessory data bus interface circuit comprises an RS-485 interface circuit.

The vehicle data bus interface circuit, in one preferred embodiment, comprises an interface circuit, and more preferably an SAE J1850 serial data bus circuit. In another preferred embodiment it comprises an interface circuit to a Chrysler collision detection (CCD) data bus developed by the assignee of the present application. In a third preferred embodiment it comprises a CAN (Controller Area Network) presently used in Europe.

The apparatus of the present invention forms a compact, relatively low cost means for providing a connection point for an external device such as a lap top computer, electronic compass, etc. to exchange information from a serial data bus of a vehicle. Advantageously, the external device can be quickly and easily uncoupled to the apparatus to allow the accessory device to be used only when needed.

BRIEF DESCRIPTION OF THE DRAWINGS

The various advantages of the present invention will become apparent to one skilled in the art by reading the following specification and subjoined claims and by referencing the following drawings in which:

FIG. 2 is a detailed schematic diagram showing in greater detail the components of the apparatus of FIG. 1.

DETAILED DESCRIPTION OF THE PREFERRED EMBODIMENTS

Figure 1:
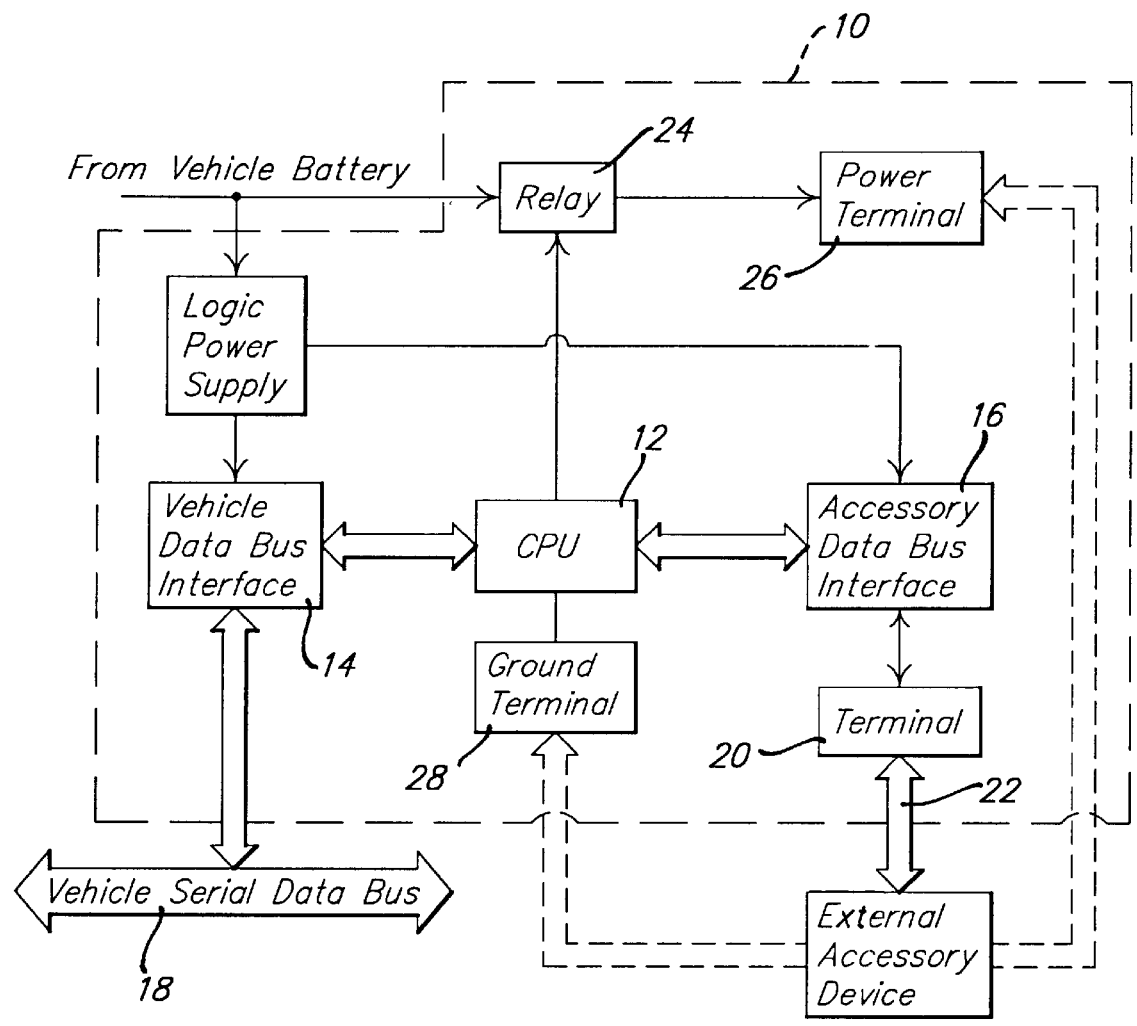
FIG. 1 is a simplified block diagram of the apparatus of the present invention.

Referring to FIG. 1, a vehicle accessory interface module 10 is shown in accordance with a preferred embodiment of the present invention. The module 10 generally comprises a central processing unit (CPU) 12 which is coupled for bi-directional communication with a vehicle data bus interface circuit 14 and with an accessory data bus interface circuit 16. The vehicle data bus interface circuit 14 is in communication with a serial data bus 18 of a vehicle with which the module 10 is associated. The accessory data bus interface 16 is coupled to a terminal 20 which allows an external device to be removably coupled to the module 10 via a suitable interface cable 22. A relay 24 controlled by the CPU 12 provides power from the vehicle's battery (not shown) to a power terminal 26. The power terminal 26 allows power to be supplied to the external accessory device. A ground terminal 28 provides a ground point for the external accessory device.

It will be appreciated that the vehicle data bus interface circuit 14 can comprise a number of different interface circuits such as a J1850 interface circuit, a CCD interface circuit, or a CAN interface circuit, or any other form of circuit used to interface to a vehicle's serial data bus. Similarly, the accessory data bus interface 16, in one embodiment, can comprise an RS-232 interface circuit, an RS-485 interface circuit or any other form of interface circuit needed to interface to the external accessory device.

Referring now to FIG. 2, a simplified electrical schematic diagram of the module 10 is illustrated. It will be appreciated that in this exemplary embodiment the vehicle data bus interface 14 comprises a pair of J1850 interface chips 14*a* and 14*b*, while the accessory data bus interface 16 comprises an RS-232 interface chip. The logic power supply 29 is comprised of a logic voltage regulator. The relay 24 is comprised of an integrated circuit.

The module 10 thus enables real-time communication between the serial data bus of a vehicle and various external devices such as lap top computers, electronic compasses, etc. In this manner the operation of the external accessory device can be enhanced by exchanging various useful information with the serial data bus during use of the vehicle. Additionally, the CPU 12 of the module 10 can be programmed at the time of manufacture to only allow certain data messages to pass through the module 10 to thereby control what data is exchanged with the vehicle data bus by the external device.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

We claim:

1. An apparatus for interfacing with a serial data bus of a motor vehicle having an on-board computer to enable information to be transferred between said serial data bus and an external accessory device to enhance operation of said external accessory device, said apparatus comprising:
   a controller for controlling the transfer of information between said serial data bus and said external accessory device;
   an accessory device communications terminal for enabling coupling of a communications cable of said external accessory device to said apparatus;
   an accessory device interface circuit disposed between said controller and said accessory device communications terminal;
   a vehicle data bus interface circuit in communication with said serial data bus and with said controller for transmitting serial data between said serial data bus and said controller;
   a DC power access terminal for supplying DC power from said vehicle's electrical system to said external accessory device;
   an ignition relay switch disposed between a battery of said vehicle and said DC power access terminal and being responsive to a signal from said controller for applying DC power to said DC power access terminal when an ignition switch of said vehicle is turned on;
   an accessory ground terminal for providing a ground point for said external accessory device; and
   a connection port on the vehicle data bus interface circuit comprising a connector allowing said apparatus to be utilized on a variety of makes and models of motor vehicles.

2. The apparatus of claim 1, wherein said accessory device interface circuit comprises an RS-232 interface circuit.

3. The apparatus of claim 1, wherein said accessory device interface circuit comprises an RS-485 interface circuit.

4. The apparatus of claim 1, wherein said vehicle data bus interface circuit comprises a CCD interface circuit.

5. The apparatus of claim 1, wherein said accessory device interface circuit comprises a J1850 interface circuit.

6. The apparatus of claim 1, wherein said vehicle data bus interface circuit comprises a Controller Area Network interface circuit.

7. A module apparatus for interfacing with a serial data bus of a motor vehicle's computer to enable information to be transferred between said serial data bus and an external accessory device such as a computer, said apparatus comprising:
   a central processing unit (CPU) for controlling communications with said serial data bus and said external accessory device;
   an accessory device communication port for permitting coupling to said external accessory device;
   an accessory device interface circuit disposed between said controller and said accessory device communications port;
   a vehicle data bus interface circuit disposed between said serial data bus and said controller;
   a DC power access terminal for supplying DC power from said vehicle's system to said external accessory device;
   a connection port on the vehicle data bus interface circuit comprising a connector allowing said apparatus to be utilized on a variety of makes and models of motor vehicles; and
   wherein said CPU is programmable to allow only selected data to pass between said module and said accessory device.

8. The apparatus of claim 7, wherein said accessory device interface circuit comprises a RS-485 interface circuit.

9. The module of claim 7, wherein said accessory device interface circuit comprises an CCD interface circuit.

10. The module of claim 7, wherein said vehicle data bus interface circuit comprises a J-1850 interface circuit.

11. The apparatus of claim 7, wherein said accessory device interface circuit comprises an RS-232 interface circuit.

* * * * *